United States Patent

Nghiem

[11] Patent Number: 5,868,021
[45] Date of Patent: Feb. 9, 1999

[54] METHOD AND APPARATUS FOR PRESSING A PRESS-FIT ELEMENT ONTO A CORD AND MEASURING THE LONGITUDINAL EXTENSION OF THE PRESS-FIT ELEMENT

[75] Inventor: Xuang Long Nghiem, Krefeld, Germany

[73] Assignee: Novopress GmbH Pressen und Presserkzeuge & Co. KG, Germany

[21] Appl. No.: 836,290
[22] PCT Filed: Aug. 16, 1996
[86] PCT No.: PCT/EP96/03624
§ 371 Date: Aug. 5, 1997
§ 102(e) Date: Aug. 5, 1997
[87] PCT Pub. No.: WO97/09755
PCT Pub. Date: Mar. 13, 1997

[30] Foreign Application Priority Data

Sep. 7, 1995 [DE] Germany .................. 195 33 054.4

[51] Int. Cl.[6] .................................... B21D 39/00
[52] U.S. Cl. ..................... 72/31.04; 72/30.1; 29/715; 29/720
[58] Field of Search ................. 72/17.3, 19.4, 72/30.1, 31.04, 3, 416; 29/715, 720, 237

[56] References Cited

U.S. PATENT DOCUMENTS

| | | | |
|---|---|---|---|
| 4,573,359 | 3/1986 | Carstensen | 73/761 |
| 4,637,242 | 1/1987 | Undin et al. | 72/410 |
| 5,038,461 | 8/1991 | Cerda | 29/753 |
| 5,113,679 | 5/1992 | Ferraro et al. | 72/21 |
| 5,224,251 | 7/1993 | Cameron et al. | 29/33 |
| 5,271,254 | 12/1993 | Gloe et al. | 72/19 |
| 5,303,462 | 4/1994 | Chitwood et al. | 29/705 |
| 5,644,944 | 7/1997 | Dischler | 72/400 |

FOREIGN PATENT DOCUMENTS

| | | |
|---|---|---|
| 604828 | 7/1994 | European Pat. Off. |
| 1935996 | 1/1970 | Germany |
| 3235040 | 12/1984 | Germany |
| 9214077 | 8/1992 | WIPO |

*Primary Examiner*—Daniel C. Crane
*Attorney, Agent, or Firm*—Joseph W. Berenato, III

[57] ABSTRACT

In a method for binding rope- or cable-type cords with press-fit elements (13), the press-fit element (13) is placed over the cord, and the cord and press-fit element (13) are compressed radially and plastically via a pressing device (1, 11, 31, 41, 51) that is equipped with pressure clamps (3, 4), such that a reduction in the material cross-section results. In accordance with the invention, the longitudinal extension of the cord and/or the press-fit element (13) is gauged during the pressing process, and compression is halted when a predetermined end value (db) for the longitudinal extension has been reached.

36 Claims, 3 Drawing Sheets

METHOD AND APPARATUS FOR PRESSING A PRESS-FIT ELEMENT ONTO A CORD AND MEASURING THE LONGITUDINAL EXTENSION OF THE PRESS-FIT ELEMENT

This application is a 371 of PCT/EP96/03624, filed Aug. 16, 1996.

BACKGROUND OF THE INVENTION

The invention involves a method for binding rope or cable-type cords with press-fit elements, in which the press-fit element is placed over the cord and the cord and the press-fit element are pressed together, radially and plastically, via a pressing device that is equipped with a pressure clamp, so that a reduction in the cross-section of the material results. The invention further relates to a pressing device used to implement this method, comprising pressure clamps that can be moved into a given pressing plane, and an adjustment drive mechanism, which can be shut off when the end position has been reached. The term pressing plane refers to a plane in which the pressure clamps can be moved toward and away from each other, and which, during the pressing process, extends crosswise to the longitudinal axis of the cord being pressed.

The technique of binding cords and electrical cables to one another or to wiring points by placing press-fit elements designed as connectors over the ends of the ropes or cables and then pressing them together radially using a pressing device (comp. DE-A-19 35 996; EP 0 604 828 A1) is known in the art. In this process, the combination of cord and press-fit element becomes plastically deformed, resulting in a reduction of its material cross-section. The term material cross-section in this case refers to that cross-sectional area or the sum of cross-sectional areas that are taken up exclusively by the material of the combination itself. If the cord is comprised not of a single continuous material but of strands or leads that are circular in cross-section, then the cross-sectional area will usually be smaller than the overall cross-sectional area taken up by the cord based upon its original outside measurements, because air spaces exist between the strands and the leads, as well as between these elements and the sleeve section of the connecting piece, adding to the material cross-section and with this cross-section forming the original overall cross-sectional surface area.

For the binding of electrical cables with other cables, or for connecting cables to electrical devices, press-fit elements such as cable brackets, cable connectors, and cable sockets are used; these are placed over the end of the electrical cable to create the connection. Using a so-called cable bracket press, the cable and the cable bracket or cable connector or cable socket are then pressed together radially. Such cable bracket presses are found, for example, in DE-C-32 35 040 and EP-A-0 604 828.

For the quality of the connection, it is important for the degree of deformation or the compression depth not to be too low, but not too high. This is particularly true when connecting cables with cable brackets or similar connectors. If the degree of deformation is too low—in other words, when there is insufficient compression—then the tensile strength of the connection and the electrical contact between the cord and the press-fit element will be insufficient. If the degree of deformation is too high—in other words—there is too much compression, then the tensile strength of the cord will suffer due to the reduction of the cord's cross-section. In addition, this will result in current densities that are too high.

In simple pressing devices, the pressure clamps are guided on blocks to meet the opposing clamp. In order for the proper degree of deformation to be achieved for every type of cable and cable bracket, it is necessary to maintain a very large number of different pressure clamps. This is ponderous and often results in mistakes in the selection of pressure clamps, resulting in insufficient quality of the connection.

For this reason, the trend has moved toward using pressing devices in which the movable pressure clamp is driven via the adjustment drive mechanism only up to the outside diameter of the press-fit element, and from there is adjusted by a predetermined amount, that of the compression depth. This type of pressing method requires that the outside diameter of the press-fit element be set for only one defined socket-cable combination, in most cases for a specific standard or series. To the extent that it is possible to determine compression depth from a series of outside diameters, it depends upon the standard being used, since the outside diameter of the press-fit element reveals nothing about the structure of the cord and the press-fit element, for example what proportion of air spaces is present. Thus, use of this type of pressing device cannot ensure that the desired quality of connection will be achieved with all combinations.

With other pressing devices, pressure is applied until a fly established final strength has been achieved. This method is even more imprecise, since the degree of deformation is severely dependent upon the geometry and the material stability of the cable and the cable bracket.

SUMMARY OF THE INVENTION

The object of the invention is to design a pressing method of the type described at the beginning, such that, by using a specific pressing device, with or without a change in tools, the most varied combinations of cords and press-fit elements can be pressed together, and such that the degree of deformation desired for the connection can be achieved with a high degree of certainty. A further object of the invention consists in providing a pressing device for the implementation of this method.

The former object is attained in accordance with the invention, in that in the pressing process, the longitudinal extension of the cable and/or the press-fit element is registered, and the pressing process is ended when a predetermined end value (db) for the longitudinal extension has been reached.

This method is based upon the discovery, which is part of the invention, that metallic work pieces exhibit virtually no change in density, provided they possess a degree of freedom to extend. In the compression of a cable with a press-fit element that has been placed upon it, this degree of freedom extends longitudinally—in other words, crosswise to the pressing plane. Actually, longitudinal extension beyond the yielding point can be registered in the pressing together of such components.

The overwhelming advantage of this method is that the quality of the connection achieved with the use of a specific pressing device is always the same, when the predetermined end value for the longitudinal extension has been reached. There is no dependency upon the type and structure of the cord and the press-fit element, nor upon their base materials. The diameters of these components also play no role. The quality of the connection is infinitely reproduceable and controllable.

The quality of connection can even be maintained at the same level, independent of the type of pressing device or pressure clamps used, if one adheres to the rule that the end value (db) must be set as a specific percentage of the width of the pressure clamps. The width of the pressure clamps in this case refers to their extension crosswise to the pressing plane—in other words, parallel to the longitudinal axis of the compressed cable. This particularly makes the method universally applicable. It is necessary only to determine the width of the pressure clamps and to establish the end value of the longitudinal extension using the predetermined percentage. Pressure clamps that might possibly deviate from the standard form, for example, clamps having rounded or wedge-shaped sides, can be allowed for by accounting for correcting values. The method specified in the invention thus enables the user to effect with certainty a specific, desired quality of connection, such that it can be infinitely reproduced using any pressing device. This provides a significant benefit to both producers and consumers.

A compromise must be found for the establishment of the end value (db) of the longitudinal extension. In the case of a purely mechanical connection, a compromise should be sought between a firm hold between the cable and the press-fit element, and the tensile strength of the cable, which is impaired at each crossover point. If electrical cable is involved, the changes in the electrical properties, which on the one hand demand solid contact between the cable and the press-fit element, and on the other, require an adequate cable cross-section, must also be accounted for. It is possible to determine experimentally which degree of compression will produce a usable or even optimum compromise, by determining, through a series of experiments, the tensile strength and—if a cable is involved—the electrical properties. The end value (db) that is thus derived for a specific pressing device can then be established as a percentage of the width of the pressure clamps of this pressing device. Then, using this percentage, the degree of compression, and thereby its quality, can be reproduced using any pressing device.

For the most frequently encountered case of a cable comprised of wires and a cable bracket, calculations have shown that an optimal compromise between the mechanical and electrical properties can be achieved when the end value (db) lies within a range of between 20 and 22% of the width of the pressure clamps, ideally at 20.9%. At this value, the cable and the cable bracket are compressed precisely far enough that the wires of the cable lie together to form a hexagonal cross-section, and such that virtually no air remains between them. These calculations are based, however, upon an ideal, symmetrically circular compression. The pressure clamps that are generally used are polygonal, which is why both excess and insufficient compression result in some places. In addition, in the case of specially shaped pressure clamps, the above-mentioned corrective values must be taken into account. Nevertheless, the above-described scope of the invention presents a favorable solution, even if pressure clamp geometries currently available on the market are used.

It lies within the framework of the invention for the above-described scope to be deviated from when, in any given application, it would seem more favorable to use lower or higher percentages for the end value (db) in relation to the width of the pressure clamps.

The method specified in the invention may also be used to control the efficiency of the pressing device. If the end value of the longitudinal extension is not reached using a given pressing device, then either the pressing device is not well suited to that combination of cable and press-fit element, or the adjustment drive mechanism of the pressing device is no longer able, due to wear and tear, to apply the necessary pressure.

In the compression of continuous material cross-sections, the reduction in the cross-section is effected immediately in a longitudinal extension. If the cable is comprised of a majority or a multitude of strands or wires, then the work piece will contain air spaces. If the share of air spaces is relatively large, then a reduction in length, at least of the press-fit element that has been placed on the cable, can occur at the start of the pressing process. Provided that the longitudinal extension of the cable is to be registered in accordance with the method specified in the invention, it is advisable that the registering of the longitudinal extension be started when the section whose longitudinal extension is to be registered stretches away from the point of pressure. Thus, in this connection, the absolute longitudinal extension in relation to the initial state, plus the amount of initial reduction in length, is applied, as this measurement stands in direct correlation to the reduction in the material cross-section, and thereby to the quality of the connection.

As the object of the invention relates to the design of a pressing device intended for the implementation of this method, the attainment of this object consists in that the pressing device is equipped with a measuring device used to gauge the longitudinal extension of the cable and/or of the press-fit element caused by the compression process. The gauging of the longitudinal extension can then be used in different ways in the operation of the pressing device.

For instance, the measuring device may be equipped with an indicator for the display of at least one end value for the longitudinal extension. The indicator may be provided with a digital or an analog display. It is, however, sufficient for the indicator to be designed to provide only an optical signal when the end value has been reached, as this value is decisive for the predetermined quality of the connection. It is also possible for the measuring device to be provided with an acoustic signaling device, with which a signal can be emitted when the end value has been reached.

Both the optical or acoustic signal emissions and the digital or analog indicators possess the disadvantage that the operator of the pressing device must take action when the end value is registered—in other words, he or she must switch off the adjustment drive mechanism. It is more reliable for the measuring device to be coupled with the adjustment drive mechanism such that the adjustment drive mechanism is automatically shut off when the end value has been registered. In this manner it can be ensured that the predetermined quality of the connection will be reliably achieved, and, more importantly, that no excess compression will occur.

A further development of the invention provides for the end value to be adjustable. This is particularly useful when the pressing device is to be operated using different pressure clamps, because each combination of pressure clamps has an end value for the longitudinal extension that is peculiar to that combination, and is thus characteristic.

For the gauging of longitudinal extension, the measuring device may be equipped with a transmitting element that can be connected to the press-fit element and/or the cable. This may, for example, be a pointed rod that is designed to press into the outside of the press-fit element or the cable such that the two interlock, thus causing the rod to undergo changes in length along with the cable and the element. The transmitting element is preferably mounted so that it can move perpendicular to the pressing plane. In addition, the transmitting element should be positioned so that it can move in the direction of its attachment—in other words cross-wise to the press-fit element—and should be prestressed, for example, using a spring, in the direction of the press-fit element.

In order for the transmitting element to be flexible, it may be mounted on an axis that is parallel to the pressing plane, so that it can swivel. The transmitting element may also be firmly clamped if it is designed to be flexible perpendicular to the pressing plane.

In all of these cases, a sensor, such as an actuator, a photoelectric barrier, a magnetic or sensor, an induction sensor, or some similar device, must be provided to detect movement of the transmitting element. Via the sensor, then, the end position of the transmitting element that represents the end value can be detected and can be transmitted in the form of an electrical signal to the measuring device for further handling, as described above. It is also possible, however, for the adjustment drive mechanism to be designed as a hydraulic drive element, and for the transmitting element to be directly connected to a shut-off valve for the hydraulic drive element. A purely mechanical solution of this type possesses the advantage of being independent of a source of electricity.

Finally, the invention provides for the transmitting element to be designed as a component which can be deformed elastically, as least perpendicular to the pressing plane, and which can be frictionally engaged to the outside of the press-fit element and/or cable, and in which are embedded electrically conductive fibers similar to a wire strain gauge, such that when electrical current is applied and the component deformed perpendicular to the pressing plane, a signal for the measuring device, which corresponds to the deformation, is emitted.

BRIEF DESCRIPTION OF THE DRAWINGS

In the diagrams, the invention is described in greater detail with the help of exemplary embodiments, each shown here in a schematic representation. These show.

DETAILED DESCRIPTION OF THE INVENTION

Figure 1:
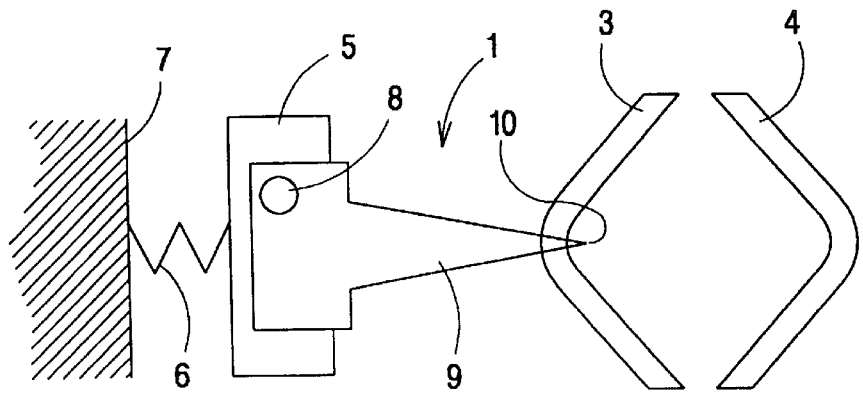
FIG. 1: a lateral view of a pressing device equipped with a measuring device.
Figure 2:
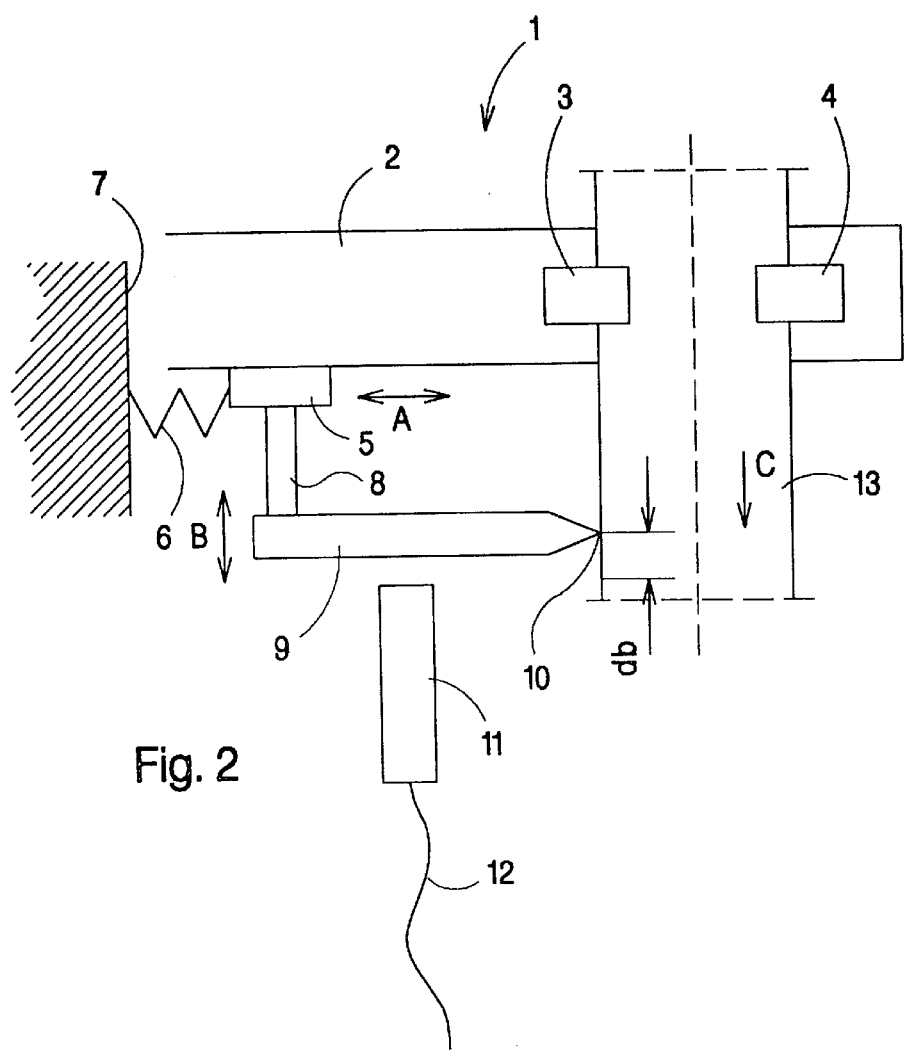
FIG. 2: an overhead view of the pressing device illustrated in FIG. 1.

The pressing device (1) depicted in FIGS. 1 and 2 comprises a body of the device (2), which has been omitted in FIG. 1 for reasons of clarity, and on which two opposing, V-shaped pressure clamps (3, 4) rest. With the help of an adjustment drive mechanism, such as a hydraulic piston cylinder unit, which is not illustrated here, the pressure clamp on the left side (3) can be moved in the direction of the pressure clamp on the right (4).

On the body of the device (2), components of a measuring device are positioned. These comprise a support base (5), which in FIG. 2 is directed so that it can be shifted, in the plane of the diagram, in the directions of the double arrow A. It is prestressed in the direction of the pressure clamps (3, 4) via a spring (6), which rests against a stationary component (7) of the pressing device (1). An axle (8) is positioned on the support base and extends perpendicular to the plane of the diagram in accordance with FIG. 1, and is designed to shift axially in the support base, or more specifically, in the directions of the double arrow B. On the end of the axle (8) is a transmitting rod (9), which has at its open end a point (10). The transmitting rod (9) is equipped with an inductive position sensor (11), which is connected via an electrical cable (12) to an evaluation device that is not illustrated here, and which is a part of the measuring device. The sensor (11) is mounted firmly to the body of the device (2).

In the illustration depicted in FIG. 2, the pressing device (1) is positioned in relation to a combination of a cable—not illustrated here—and a cable bracket (13), placed over the cable as a press-fit element, such that this combination is held between the pressure clamps (3, 4). Due to the prestressing effected by the spring (6), the point (10) of the transmitting rod (9) is pressed against the outside of the cable bracket (13) so that it becomes interlocked with it, or is at least frictionally engaged with it.

After the point (10) has been positioned against the outside of the cable bracket (13), the pressing process can begin. In this process the pressure clamp (3) is moved toward the pressure clamp (4). This results in a radial constriction of the cross-section of the cable and the cable bracket (13). The material of the cable and the cable bracket (13) that has been displaced by the pressure clamps (3, 4) causes a longitudinal extension db of the combination of cable and cable bracket (13). Due to the interlocking, or at least the frictional engagement, between the point (10) and the outside of the cable bracket (13), the transmission rod (9) is moved along in the direction of the arrow C, and thereby in the direction of the sensor (11)—in other words, it is shifted in this direction parallel to the cable and cable bracket. The shifting results in a change in the inductivity in the position sensor (11). When a value for the inductivity, which has been stored in the evaluating device, is reached, either an optical or an acoustic signal is emitted, or the adjustment drive mechanism for the pressure clamp (3) is automatically shut off.

The longitudinal extension db correlates to the material displacement in the pressing plane, effected by the pressure clamps (3, 4). The end value db for the longitudinal extension has been established for the pressing device depicted here, such that the most optimal ratio between the cross-section of the final material and the cross-section of the initial material is achieved, and thereby an optimal quality of connection is achieved. If the end value db for the longitudinal extension is always reached using this pressing device (1), then the quality of the connection is always the same, regardless of the way in which the combination of cable and cable bracket (13) is structured.

Figure 3:
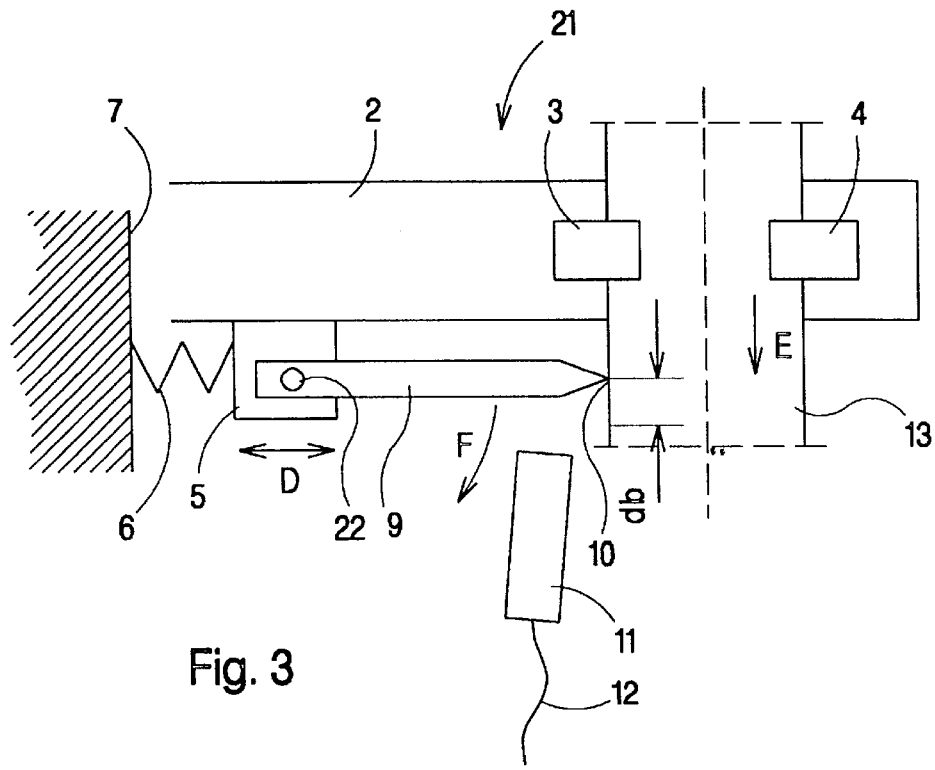
FIG. 3: an overhead view of a second pressing device equipped with a measuring device.
Figure 4:
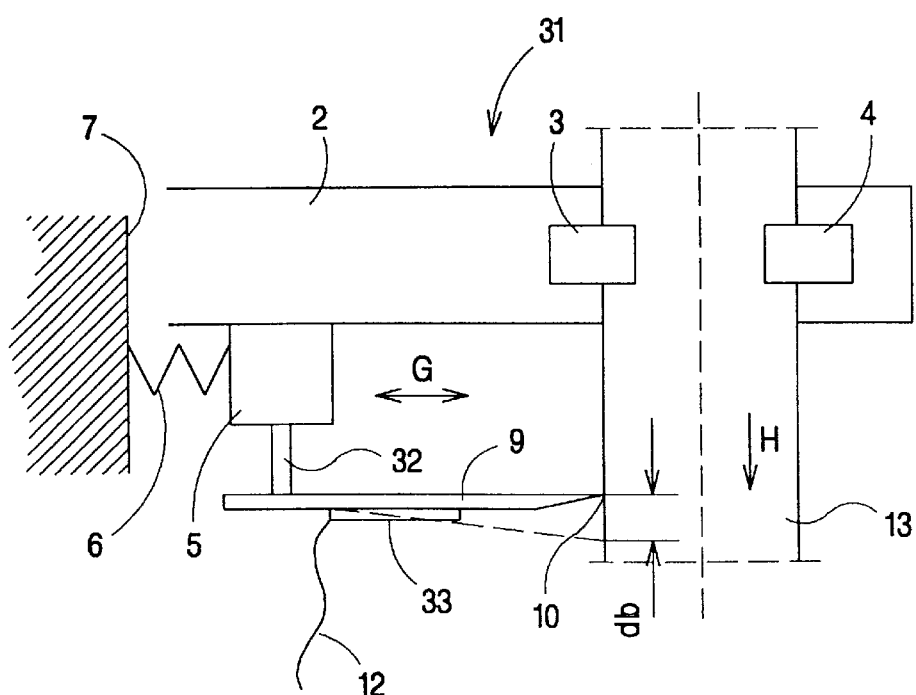
FIG. 4: an overhead view of a third pressing device equipped with a measuring device.

FIGS. 3 and 4 show variations of the pressing device (1) in accordance with FIGS. 1 and 2. For this reason, the same or corresponding components are indicated by the same characters.

The pressing device (21) illustrated in FIG. 3—as with the device illustrated in FIGS. 1 and 2—comprises a body of the device (2) and two opposing pressure clamps (3, 4). On the body of the device (2), a support base (5) that is part of the measuring device is also positioned so that it can shift in the directions of the double arrow D, with this support base being prestressed in the direction of the pressure clamps (3, 4), by a spring (6), which rests against a stationary component (7) of the body of the device (2). On the support base (5) is a swiveling axis (22), which extends perpendicular to the plane of the diagram, and on which a transmitting rod (9) rests. The transmitting rod (9) has at its open end a point (10). An inductive position sensor (11) is connected to the transmitting rod (9), and is also connected via a cable (12) to the evaluation unit of the measuring device.

Between the pressure clamps (3, 4) lies a combination of cable and cable bracket (13). On the outside of the cable bracket (13) lies the point 10 of the transmitting rod (9), either interlocking with the bracket or at least frictionally engaged with it.

With the commencement of the pressing process via the activation of the adjustment drive mechanism, which is not illustrated here, and thus via the approach of the pressure clamps (3, 4) to one another, the material of the cable and the cable bracket (13) is constricted in the pressing plane, resulting in a longitudinal extension in the direction of the arrow E. This, then, results in a swiveling movement of the transmitting rod (9) around the swiveling axis (22), in the direction of the arrow F. This results in a change in inductivity in the position sensor (11), which is transmitted via the cable (12) to the evaluation unit. There a threshold value is set such that, when the end value db of the longitudinal extension has been reached, an optical or acoustical signal is emitted, or the adjusting driving element is automatically shut off.

The design illustrated in FIG. 4 is similar to those illustrated in FIGS. 1 through 3. A pressing device (31) comprises a body of the device (2) and pressure clamps (3, 4), which can be moved towards or away from each other via an adjustment drive mechanism that is not illustrated here. On the body of the device(2), a support base (5) is positioned such that it can be shifted in the directions of the double arrow G. The base is prestressed in the direction of the pressure clamps (3, 4) via a spring (6), which rests on a stationary component (7) of the body of the device (2). An extension piece (32) is mounted on the support base (5); at the open end of this piece, a transmitting rod (9) is positioned such that it is fixed. The transmitting rod (9) is flexible crosswise to the pressing plane—in other words, in the direction of the arrow H, and has at its open end a point (10). A sensor (33) equipped with a piezoelectric plate is positioned on the upper surface of the transmitting rod (9), and is connected to the evaluating unit of a measuring device via a cable (12).

A combination of cable and cable bracket (13) is placed between the pressure clamps (3, 4). When the pressure clamps (3, 4) are moved towards one another, a longitudinal extension in the direction of the arrow H also occurs as a result of the constriction of the material in the pressing plane. This also causes the transmitting rod (9), which is placed against the outside surface of the cable bracket (13) such that it interlocks with it or is at least frictionally engaged with it, to bend, which is detected by the sensor (33) and is transmitted to the evaluation device. When a value that has been stored in this device is reached, the adjustment drive mechanism of the pressing device (31) is shut off. At that point, the end value db of the longitudinal extension has been reached. The bending of the transmitting rod (9) is indicated here with a dashed line.

Figure 5:
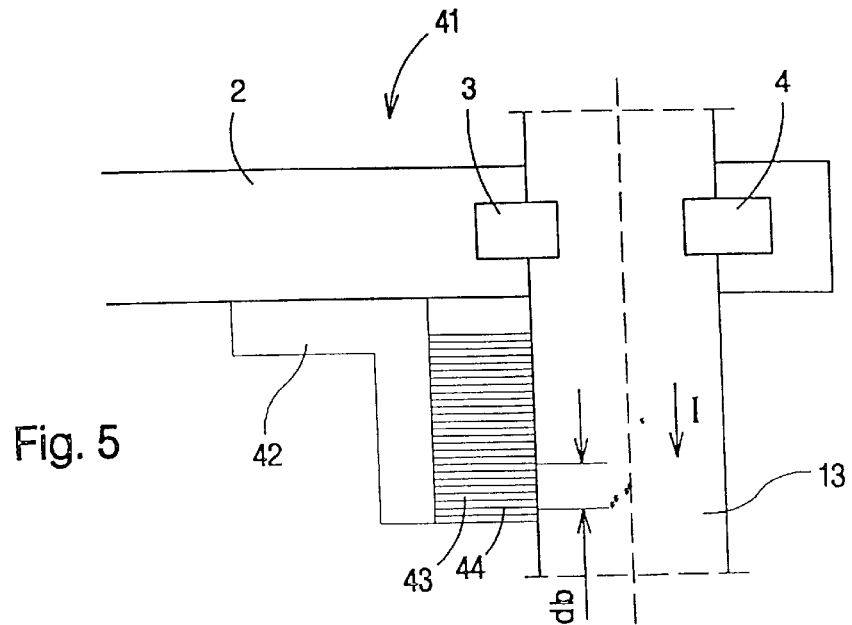
FIG. 5: an overhead view of a fourth pressing device equipped with a measuring device.

In FIG. 5 a pressing device (41) is illustrated, which comprises a body of the device (2) and opposing pressure clamps (3, 4), which can be moved towards or away from one another in the plane of the diagram, via an adjustment drive mechanism, which is not illustrated here. A corner bracket (42) is attached to the body of the device (2) and is positioned, similar to the support base (5) in the previous examples, so that it can move in the direction of the pressure clamps (3, 4), and is prestressed in this same direction; this is not illustrated in this example. A rubber component (43), in which a multitude of electrically conductive fibers—indicated here, for example, with the number (44)—are embedded, is fastened to the part of the corner bracket (42) that extends crosswise to the body of the device (2). They are a part of an electrical circuit that is not further illustrated here. When the fibers (44) undergo a position change via the elastic deformation of the rubber component (43) in a crosswise direction to the pressing plane, the electrical values of the circuit also change.

A combination of cable and cable bracket (13) is placed between the pressure clamps (3, 4). The rubber component (43) lies on the outside surface of the cable bracket (13), in frictional engagement with it. Compression of the combination of cable and cable bracket results—as was already described in detail above—in a longitudinal extension of the cable bracket (13), in which the adjacent surface of the rubber component (43) is moved along with the combination. The rubber component 43) thus becomes elastically deformed, with the result that the electrical values in the circuit of the fibers (44) change. When a specific value that is stored in the evaluation device has been reached, the adjustment drive mechanism for the pressure clamps (3, 4) is shut off. At that point, the end value db for the longitudinal extension in the direction of the arrow I has been reached.

Figure 6:
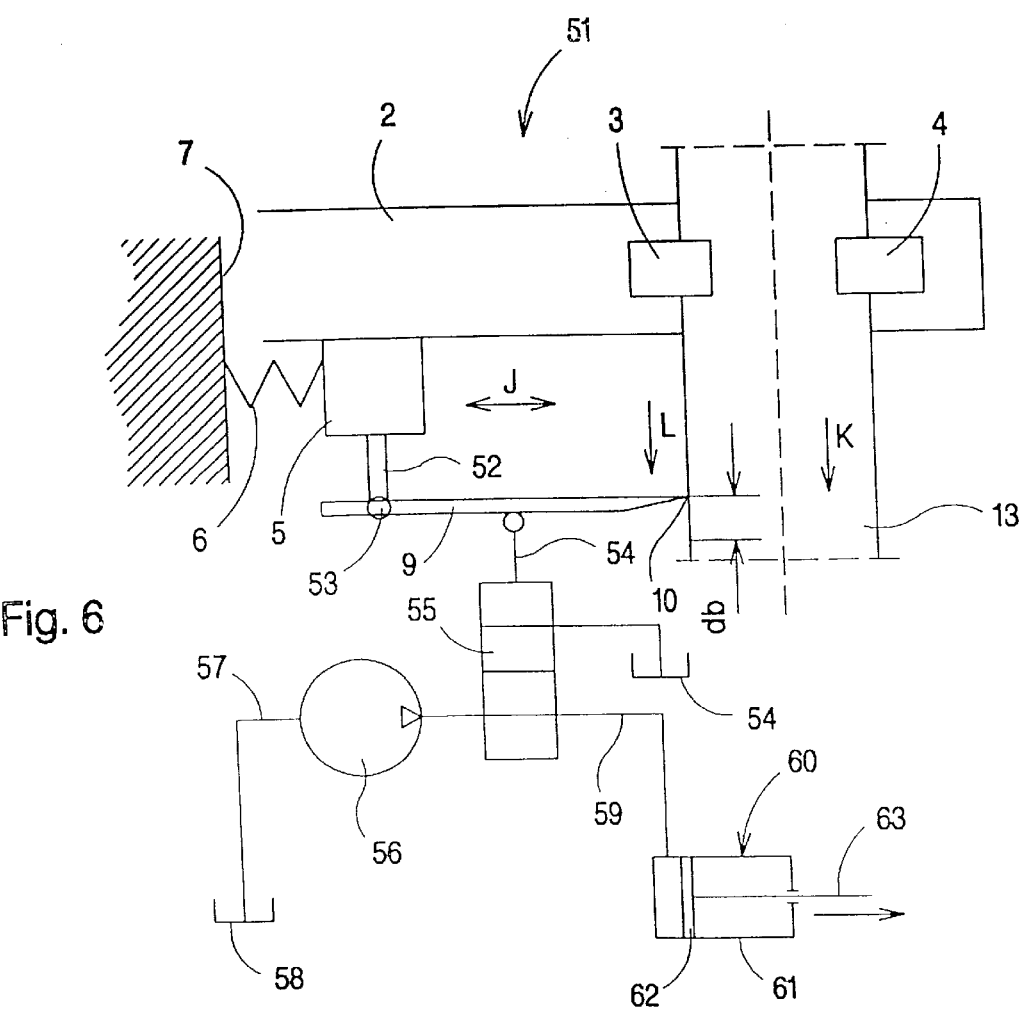
FIG. 6: a fifth pressing device equipped with a measuring device.

FIG. 6 shows a pressing device (51) comprising a body of the device (2) and opposing pressure clamps (3, 4). As in the examples illustrated in FIGS. 1 through 4, a support base (5) is attached to the body of the device (2) such that it can shift in the directions of the double arrow J, with the base being prestressed in the direction of the pressure clamps (3, 4) via a spring (6), which rests on a stationary component (7) of the body of the device (2). The support base (5) contains an extension piece (52), at the free end of which a swivel joint (53) with a swiveling axis is positioned perpendicular to the plane of the diagram. On the swivel joint (53) rests a transmitting rod (9), which is equipped at its open end with a point (10). On the outside surface of the transmitting rod (9), between the swivel joint (53) and the point (10) rests a valve plunger (54), which is connected to a hydraulic valve (55). This hydraulic valve (55) is equipped on one side with a hydraulic pump (56), which is connected via a line (57) to a hydraulic fluid reservoir (58).

From the hydraulic pump (56), an outflow line (59) leads through the hydraulic valve (55), shown here in its open position, to an adjustment drive mechanism (60), which is comprised of a hydraulic cylinder (61), a hydraulic piston (62) positioned inside this cylinder, and a piston rod (63) that extends beyond the hydraulic cylinder (61). The hydraulic cylinder (61) is connected firmly to the body of the device such that it is stationary, while the piston rod (63) is connected to the movable pressure clamp (3); this is not illustrated here.

A combination of cable and cable bracket (13) is placed between the pressure clamps (3, 4). The point (10) of the transmitting rod (9) lies against this combination so that it interlocks with it or is at least in frictional engagement with it. The pressing process is commenced when the hydraulic fluid delivered by the hydraulic pump (56) is fed into the hydraulic cylinder (61) via the opening of the hydraulic valve (55). This causes the pressure clamps (3, 4) to move towards one another, which results in a radial constriction of the combination of cable and cable bracket (13). This constriction results in the cable bracket (13) undergoing longitudinal extension in the direction of the arrow K. In this process, the point (10) of the transmitting rod (9) is also moved in the direction of the arrow L. The swiveling of the transmitting rod (9) results in the operation of the hydraulic valve (55). In addition, the hydraulic valve (55) is designed such that when the end value db of the longitudinal extension is reached, the supply of fluid to the hydraulic cylinder (61) is closed off, and the fluid that is then delivered flows into an equalizing reservoir (64), from which it returns to the hydraulic fluid reservoir (58).

I claim:

1. A method for binding rope- or cable-type cords using a press-fit element which is placed over the cords, the method comprising the steps of:

radially compressing at least one of the cords and the press-fit element using pressure clamps to cause a cross-sectional reduction in a material which defines said at least one of the cords and the press-fit element;

gauging, during the compressing step, a longitudinal extension which results from movement of the material in response to the compressing step; and halting the compressing step when the longitudinal extension has been increased by the compressing step to a predetermined magnitude represented by a predetermined end value.

2. A method in accordance with claim 1, wherein the step of gauging the longitudinal extension begins when the material whose longitudinal extension is to be gauged stretches away from where said pressure clamps perform said step of radially compressing.

3. A method in accordance with claim 1, wherein said predetermined magnitude depends on a specific percentage of a width of the pressure clamps so that the step of halting is performed in a manner dependent upon said width, said width being taken longitudinally along the cords.

4. A method in accordance with claim 3, wherein said specific percentage lies within a range of between 20 and 22% of the width of the pressure clamps.

5. A pressing device designed for implementing a method for binding rope- or cable-type cords using a press-fit element which is placed over the cords, the method comprising the steps of radially compressing at least one of the cords and the press-fit element to cause a cross-sectional reduction in a material which defines said at least one of the cords and the press-fit element; gauging, during the compressing step, a longitudinal extension which results from movement of the material in response to the compressing step; and halting the compressing step when the longitudinal extension has been increased by the compressing step to a predetermined magnitude represented by a predetermined end value, said pressing device comprising:

pressure clamps that can be moved into a specific pressing plane to perform said step of radially compressing said at least one of the cords and the press-fit element;

an adjustment drive mechanism which is connected at least indirectly to the pressure clamps to selectively move said pressure clamps and which can be shut off when an end position has been reached to thereby terminate movement of the pressure clamps; and a measuring device for gauging the longitudinal extension of the material during said step of radially compressing said at least one of the cords and the press-fit element.

6. A pressing device in accordance with claim 5, wherein the measuring device is equipped with an indicating device for displaying said predetermined end value.

7. A pressing device in accordance with claim 6, wherein the indicating device comprises a digital or an analog indicator.

8. A pressing device in accordance with claim 6, wherein the indicating device is designed to emit an optical signal when the predetermined end value has been reached.

9. A pressing device in accordance with claim 5, wherein the measuring device is equipped with an acoustic signal emitting device, with which a signal can be emitted at least when the predetermined end value has been reached.

10. A pressing device in accordance with claim 5, wherein the measuring device is coupled with the adjustment drive mechanism such that the adjustment drive mechanism is automatically shut off when the predetermined end value has been reached.

11. A pressing device in accordance with claim 5, wherein the predetermined end value can be set.

12. A pressing device in accordance with claim 6, wherein the measuring device is equipped with a transmitting element which is adapted to engage said material and to transmit movement of the material into a movement to which the measuring device is responsive.

13. A pressing device in accordance with claim 12, wherein the transmitting element is positioned such that it can move perpendicular to the pressing plane.

14. A pressing device in accordance with claim 12, wherein the transmitting element is positioned so that it can move and is prestressed in the direction of its movement.

15. A pressing device in accordance with claim 13, wherein the transmitting element is positioned on an axis that is parallel to the pressing plane, such that it can swivel.

16. A pressing device in accordance with claim 12, wherein the transmitting element is positioned such that it can shift perpendicular to the pressing plane.

17. A pressing device in accordance with claim 12, wherein the transmitting element is flexible perpendicular to the pressing plane.

18. A pressing device in accordance with claim 12, wherein a sensor is provided for the detection of the movement of the transmitting element.

19. A pressing device in accordance with claim 12, wherein the adjustment drive mechanism is designed as a hydraulic drive element, and the transmitting element is directly connected to a shut-off valve for the hydraulic drive element.

20. A pressing device in accordance with claim 12, wherein the transmitting element is designed as a component which can be elastically deformed at least in a perpendicular direction to the pressing plane, and in which electrically conductive fibers are embedded such that when electrical current is applied and the component becomes deformed perpendicular to the pressing plane a signal that corresponds to the deformation is transmitted to the measuring device.

21. A pressing device comprising:

pressure clamps that can be moved into a specific pressing plane to press at least one cord and a press-fit element;

an adjustment drive mechanism which is connected at least indirectly to the pressure clamps to selectively move said pressure clamps and which can be shut off when an end position has been reached to thereby terminate movement of the pressure clamps; and a measuring device for gauging the longitudinal extension of a material during radial compression of said at least one of the cord and the press-fit element.

22. A pressing device in accordance with claim 21, wherein the measuring device is equipped with an indicating device for displaying an end value representing said end position.

23. A pressing device in accordance with claim 22, wherein the indicating device comprises a digital or an analog indicator.

24. A pressing device in accordance with claim 22, wherein the indicating device is designed to emit an optical signal when the end position has been reached.

25. A pressing device in accordance with claim 21, wherein the measuring device is equipped with an acoustic signal emitting device, with which a signal can be emitted at least when the end position has been reached.

26. A pressing device in accordance with claim 21, wherein the measuring device is coupled with the adjustment drive mechanism such that the adjustment drive mechanism is automatically shut off when the end position has been reached.

27. A pressing device in accordance with claim 21, wherein the end position can be set.

28. A pressing device in accordance with claim 22, wherein the measuring device is equipped with a transmitting element which is adapted to engage said material and to transmit movement of the material into a movement to which the measuring device is responsive.

29. A pressing device in accordance with claim 28, wherein the transmitting element is positioned such that it can move perpendicular to the pressing plane.

30. A pressing device in accordance with claim 28, wherein the transmitting element is positioned so that it can move and is prestressed in the direction of its movement.

31. A pressing device in accordance with claim 29, wherein the transmitting element is positioned on an axis that is parallel to the pressing plane, such that it can swivel.

32. A pressing device in accordance with claim 28, wherein the transmitting element is positioned such that it can shift perpendicular to the pressing plane.

33. A pressing device in accordance with claim 28, wherein the transmitting element is flexible perpendicular to the pressing plane.

34. A pressing device in accordance with claim 28, wherein a sensor is provided for the detection of the movement of the transmitting element.

35. A pressing device in accordance with claim 28, wherein the adjustment drive mechanism is designed as a hydraulic drive element, and the transmitting element is directly connected to a shut-off valve for the hydraulic drive element.

36. A pressing device in accordance with claim 28, wherein the transmitting element is designed as a component which can be elastically deformed at least in a perpendicular direction to the pressing plane, and in which electrically conductive fibers are embedded such that when electrical current is applied and the component becomes deformed perpendicular to the pressing plane a signal that corresponds to the deformation is transmitted to the measuring device.

* * * * *